United States Patent
Kim et al.

(10) Patent No.: US 11,722,795 B2
(45) Date of Patent: Aug. 8, 2023

(54) IMAGE PROCESSING DEVICE FOR NOISE REDUCTION USING DUAL CONVERSION GAIN AND OPERATION METHOD THEREOF

(71) Applicant: Samsung Electronics Co., Ltd., Suwon-si (KR)

(72) Inventors: Daeyoung Kim, Hwaseong-si (KR); Kundong Kim, Seongnam-si (KR); Jongwoo Kim, Suwon-si (KR); Suyoung Lee, Daejeon (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/670,793

(22) Filed: Feb. 14, 2022

(65) Prior Publication Data
US 2022/0417457 A1     Dec. 29, 2022

(30) Foreign Application Priority Data

Jun. 25, 2021     (KR) .................. 10-2021-0083080

(51) Int. Cl.
*H04N 5/355*     (2011.01)
*H04N 25/59*     (2023.01)
*H04N 25/60*     (2023.01)
*H04N 25/587*    (2023.01)

(52) U.S. Cl.
CPC .......... *H04N 25/59* (2023.01); *H04N 25/587* (2023.01); *H04N 25/60* (2023.01)

(58) Field of Classification Search
CPC ... H04N 5/3559; H04N 5/35572; H04N 5/357
See application file for complete search history.

(56) References Cited

U.S. PATENT DOCUMENTS

| | | |
|---|---|---|
| 7,075,049 B2 | 7/2006 | Rhodes et al. |
| 9,402,039 B2 | 7/2016 | Solhusvik et al. |
| 10,326,908 B2 | 6/2019 | Asamura et al. |
| 10,847,556 B2 | 11/2020 | Ikuma et al. |

(Continued)

FOREIGN PATENT DOCUMENTS

| | | |
|---|---|---|
| JP | 2020-043391 A | 3/2020 |
| JP | 2020-115604 A | 7/2020 |
| KR | 10-0763442 B1 | 10/2007 |

*Primary Examiner* — Yogesh K Aggarwal
(74) *Attorney, Agent, or Firm* — Harness, Dickey & Pierce, P.L.C.

(57) ABSTRACT

Disclosed is a device for noise reduction using dual conversion gain, which includes an image sensor including a pixel array, the pixel array configured to generate a first pixel signal corresponding to a first conversion gain and a second pixel signal corresponding to a second conversion gain from pixels sharing a floating diffusion region and the image sensor configured to generate first image data and second image data based on the first pixel signal and the second pixel signal, and an image signal processor that generates an output image based on the first image data and the second image data. The image signal processor includes a normalization circuit that normalizes the first image data based on a dynamic range of the second image data to generate third image data, and a blending circuit that generates the output image based on the second image data and the third image data.

19 Claims, 12 Drawing Sheets

(56) References Cited

U.S. PATENT DOCUMENTS

| | | | |
|---|---|---|---|
| 2018/0096468 A1* | 4/2018 | Nguyen | G06T 5/50 |
| 2020/0119060 A1* | 4/2020 | Altice, Jr. et al. | H04N 5/363 |
| 2020/0284575 A1 | 9/2020 | Yao et al. | |
| 2020/0336683 A1 | 10/2020 | Kobuse | |

* cited by examiner

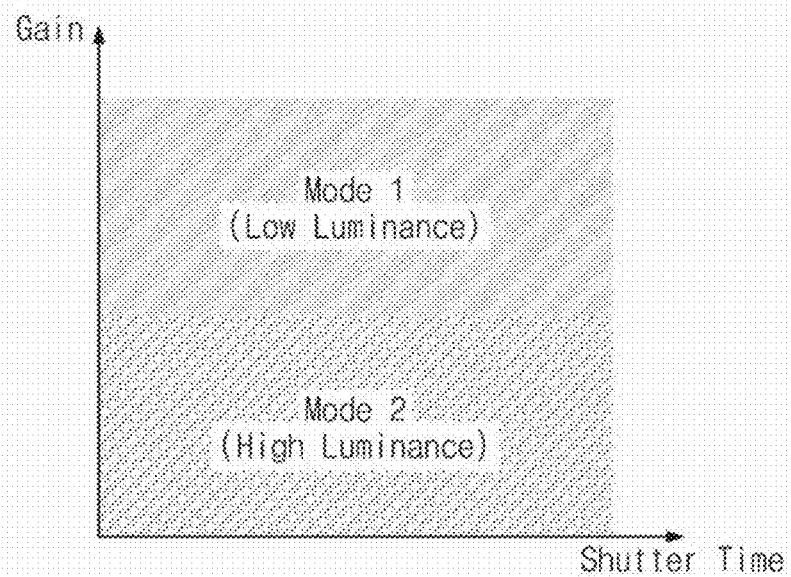

IMAGE PROCESSING DEVICE FOR NOISE REDUCTION USING DUAL CONVERSION GAIN AND OPERATION METHOD THEREOF

CROSS-REFERENCE TO RELATED APPLICATIONS

This application claims priority under 35 U.S.C. § 119 to Korean Patent Application No. 10-2021-0083080 filed on Jun. 25, 2021, in the Korean Intellectual Property Office, the disclosures of which are incorporated by reference herein in their entireties.

BACKGROUND

Example embodiments of the present disclosure described herein relate to electronic devices, and more particularly, relate to image processing devices for noise reduction using a dual conversion gain and operation methods thereof.

An image sensor includes a charge coupled device (CCD) image sensor, a complementary metal-oxide semiconductor (CMOS) image sensor (CIS), etc. The CMOS image sensor includes pixels composed of CMOS transistors and converts light energy into an electrical signal by using a photoelectric conversion element (or device) included in each pixel. The CMOS image sensor obtains information about a captured/photographed image by using the electrical signal generated by each pixel.

Meanwhile, with the increasing demand of the CMOS image sensor included in a smartphone and the increasing demand on a high-quality image, various techniques for noise reduction of an output image are being developed. In particular, it is necessary to sufficiently secure brightness of an image photographed in a low-illuminance environment in which an exposure time is restricted and also to reduce a noise due to amplification.

SUMMARY

Example embodiments of the present disclosure provide image processing devices for reducing a noise of an output image by using a dual conversion gain and operation methods thereof.

According to an embodiment, a device for noise reduction using a dual conversion gain includes an image sensor that includes a pixel array, the pixel array being generating configured to generate a first pixel signal corresponding to a first conversion gain and generate a second pixel signal corresponding to a second conversion gain from pixels sharing a floating diffusion region, and configured to the image sensor being configured to generate first image data and second image data based on the first pixel signal and the second pixel signal, and an image signal processor that generates an output image based on the first image data and the second image data. The image signal processor includes a normalization circuit that normalizes the first image data based on a dynamic range of the second image data to generate third image data, and a blending circuit that generates the output image based on the second image data and the third image data.

According to an embodiment, a device for noise reduction using a dual conversion gain includes a lens that receives a light reflected from an object, an image sensor that includes a pixel, the pixel array configured to generate generating a first pixel signal corresponding to a first conversion gain and a second pixel signal corresponding to a second conversion gain from pixels sharing a floating diffusion region, and configured to the image sensor configured to receive a light from the lens and to generate first image data and second image data based on the first pixel signal and the second pixel signal, an image signal processor that generates an output image based on the first image data or the second image data, and a main processor that generates a video stream based on the output image. The image signal processor includes a normalization circuit that normalizes the first image data based on a dynamic range of the second image data to generate third image data, and a blending circuit that generates the output image based on the second image data and the third image data.

According to an embodiment, an operation method of a device for noise reduction using dual conversion includes generating first image data corresponding to a first conversion gain and second image data corresponding to a second conversion gain, normalizing the first image data based on a dynamic range of the second image data to generate third image data, generating an output image based on the first image data or the second image data, and generating a video stream based on the output image.

BRIEF DESCRIPTION OF THE FIGURES

The above and other objects and features of the present disclosure will become apparent by describing in detail embodiments thereof with reference to the accompanying drawings.

FIG. 4B is a circuit diagram illustrating floating diffusion regions when a dual conversion transistor of FIG. 3 is turned on.

FIG. 6 illustrates an example of determining whether to perform noise reduction using a dual conversion gain depending on a shutter time and a conversion gain of the image sensor 120.

FIG. 7 illustrates an example of an output image according to a result of determining whether to perform noise reduction using a dual conversion gain, which is described with reference to FIG. 6

DETAILED DESCRIPTION

Below, example embodiments of the present disclosure will be described in detail and clearly to such an extent that one skilled in the art easily carries out the present disclosure.

In the detailed description, components described with reference to the terms "unit", "module", "block", "~er or ~or", etc. and function blocks illustrated in drawings will be implemented with, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
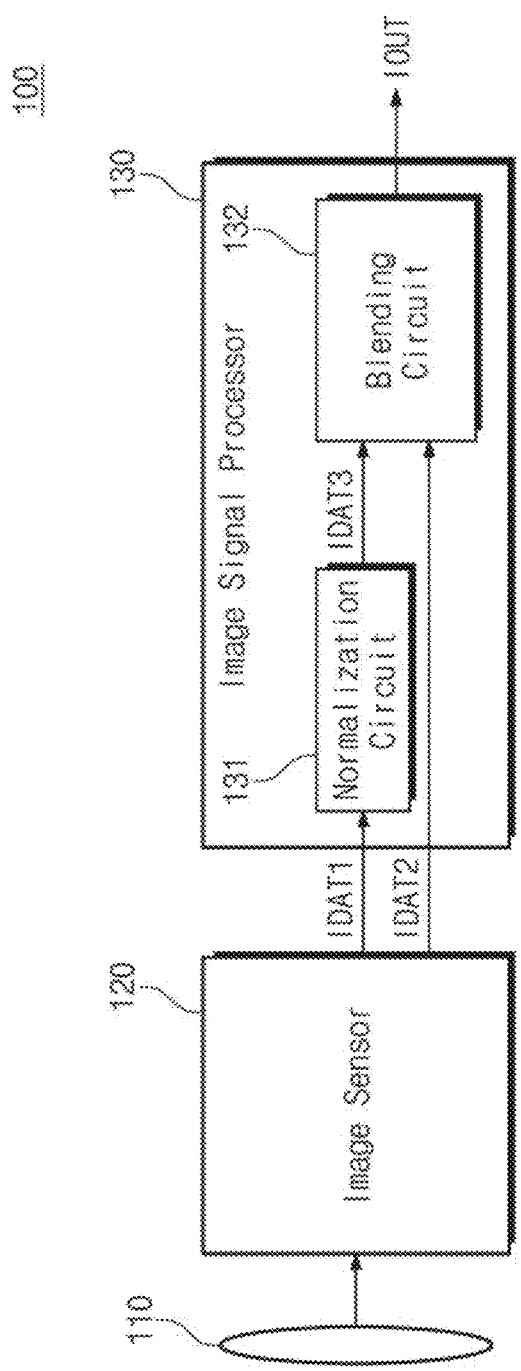
FIG. 1 illustrates an example of a configuration of an image processing block according to some example embodiments of the present disclosure.

FIG. 1 illustrates an example of a configuration of an image processing block 100 according to some example embodiments of the present disclosure. The image processing block 100 may be implemented as a part of various electronic devices such as a smartphone, a digital camera, a laptop computer, and/or a desktop computer. The image processing block 100 may include a lens 110, an image sensor 120, and an image signal processor 130.

A light may be reflected by an object, a scenery, etc. targeted for photographing, and the lens 110 may receive the reflected light. The image sensor 120 may generate an electrical signal based on the light received through the lens 110. For example, the image sensor 120 may be implemented with a complementary metal-oxide semiconductor (CMOS) image sensor or the like. For example, the image sensor 120 may be a multi-pixel image sensor having a dual pixel structure or a tetracell structure.

The image sensor 120 may include a pixel array. The pixels of the pixel array may convert a light into electrical signals to generate pixel signals. A ratio in which a light is converted into an electrical signal (e.g., a voltage) may be defined as "conversion gain". In particular, the pixel array may generate a pixel signal under a low conversion gain condition and a high conversion gain condition, by using a change of a conversion gain, that is, a dual conversion gain.

In addition, the image sensor 120 may include an analog-to-digital converting (ADC) circuit for performing correlated double sampling (CDS) on the pixel values so as to be converted into electrical signals. In detail, the ADC circuit of the present disclosure may output first image data IDAT1 corresponding to a pixel signal generated under the low conversion gain condition from among pixel signals generated from the pixel array, and may output second image data IDAT2 corresponding to a pixel signal generated under the high conversion gain condition from among the pixel signals. A configuration of the image sensor 120 will be described in more detail with reference to FIG. 2, and a configuration of the pixel array associated with the dual conversion gain will be described in more detail with reference to FIGS. 3, 4A, and 4B.

The image signal processor 130 may appropriately process the first image data IDAT1 and/or the second image data IDAT2 output from the image sensor 120 and thus may generate an output image IOUT associated with the photographed object or scenery. For example, the output image IOUT may be a still image, or may be an image constituting each video frame of a video. To this end, the image signal processor 130 may perform various processing such as color correction, auto white balance, gamma correction, color saturation correction, bad pixel correction, hue correction, noise reduction, and the like.

The image processing block 100 of the present disclosure may operate in a first operating mode or a second operating mode, based on ambient illuminance of an object. For example, the image processing block 100 may operate in the first operating mode in a low-illuminance environment in which the image sensor 120 fails to receive a light sufficiently, and may operate in the second operating mode in a high-illuminance environment in which the image sensor 120 receives a light sufficiently.

In the first operating mode, the image sensor 120 may output the first image data IDAT1 corresponding to the low conversion gain and the second image data IDAT2 corresponding to the high conversion gain, and the image signal processor 130 may perform noise reduction by using the dual conversion gain. In detail, in the first operating mode, the image signal processor 130 may blend the first image data IDAT1 corresponding to the low conversion gain and the second image data IDAT2 corresponding to the high conversion gain and thus may generate the output image IOUT in which a noise is reduced. To this end, the image signal processor 130 may include a normalization circuit 131 and a blending circuit 132.

Brightness of an image that the first image data IDAT1 corresponding to the low conversion gain indicates may be darker than brightness of an image that the second image data IDAT2 corresponding to the high conversion gain indicates. In other words, a dynamic range of the first image data IDAT1 and a dynamic range of the second image data IDAT2 may be different. Accordingly, to match the dynamic ranges of the first image data IDAT1 and the second image data IDAT2, the normalization circuit 131 may normalize brightness values of the first image data IDAT1 depending on the dynamic range of the second image data IDAT2 and thus may generate third image data IDAT3.

However, the present disclosure is not limited thereto. For example, the normalization circuit 131 may normalize brightness values of the second image data IDAT2 depending on the dynamic range of the first image data IDAT1 and thus may generate third image data IDAT3. Below, to make the description clear, it is assumed that the normalization circuit 131 normalizes the brightness values of the first image data IDAT1 to generate the third image data IDAT3.

The blending circuit 132 may blend the second image data IDAT2 and the third image data IDAT3 to generate the noise-reduced output image IOUT. For example, the output image IOUT may be generated by multiplying values of the third image data IDAT3 and a first weight together and multiplying values of the second image data IDAT2 and a second weight together. That is, the output image IOUT may indicate an image, in which a noise is reduced compared to the first to third image data IDAT1 to IDAT3, by using the dual conversion gain.

The first weight and the second weight may be arbitrary values determined in advance or at the time of calculation to be assigned to the image data. For example, the first weight may be set to "a" being a value between "0" and "1", and the second weight may be set to "1−a" being a value of subtracting the first weight from "1". However, the present disclosure is not limited thereto. For example, the output image IOUT may be generated by using various schemes that are based on the first to third image data IDAT1 to IDAT3.

For example, the noise reduction using the dual conversion gain according to some example embodiments of the present disclosure may be performed to reduce a temporal noise of an image. However, the present disclosure is not limited thereto. The noise reduction using the dual conversion gain may also be performed to reduce different kinds of noises (e.g., a spatial noise and a fixed pattern noise).

The noise reduction using the dual conversion gain described above may be performed with respect to a still image and may also be performed with respect to an image constituting a video frame. A signal to noise ratio (SNR) of the image sensor 120 may be improved by performing the noise reduction using the dual conversion gain.

Meanwhile, in the second operating mode, the image sensor 120 may output only the first image data IDAT1 corresponding to the low conversion gain, and the image signal processor 130 may generate the output image IOUT by processing the first image data IDAT1 without the above operations of the normalization circuit 131 and the blending circuit 132.

Whether the image processing block 100 operates in the first operating mode or operates in the second operating mode may be automatically determined by ambient illuminance of an object, which an illumination sensor (not illustrated) placed outside the image processing block 100 senses, or may be determined in response to an input of the user. This will be described in more detail with reference to FIG. 9.

One lens 110 and one image sensor 120 are illustrated in FIG. 1. However, in some example embodiments, the image processing block 100 may include a plurality of lenses and a plurality of image sensors. In this case, the plurality of lenses may have different fields of view. Also, the plurality of image sensors may have different functions, different performances, and/or different characteristics, and may respectively include pixel arrays of different configurations.

Figure 2:
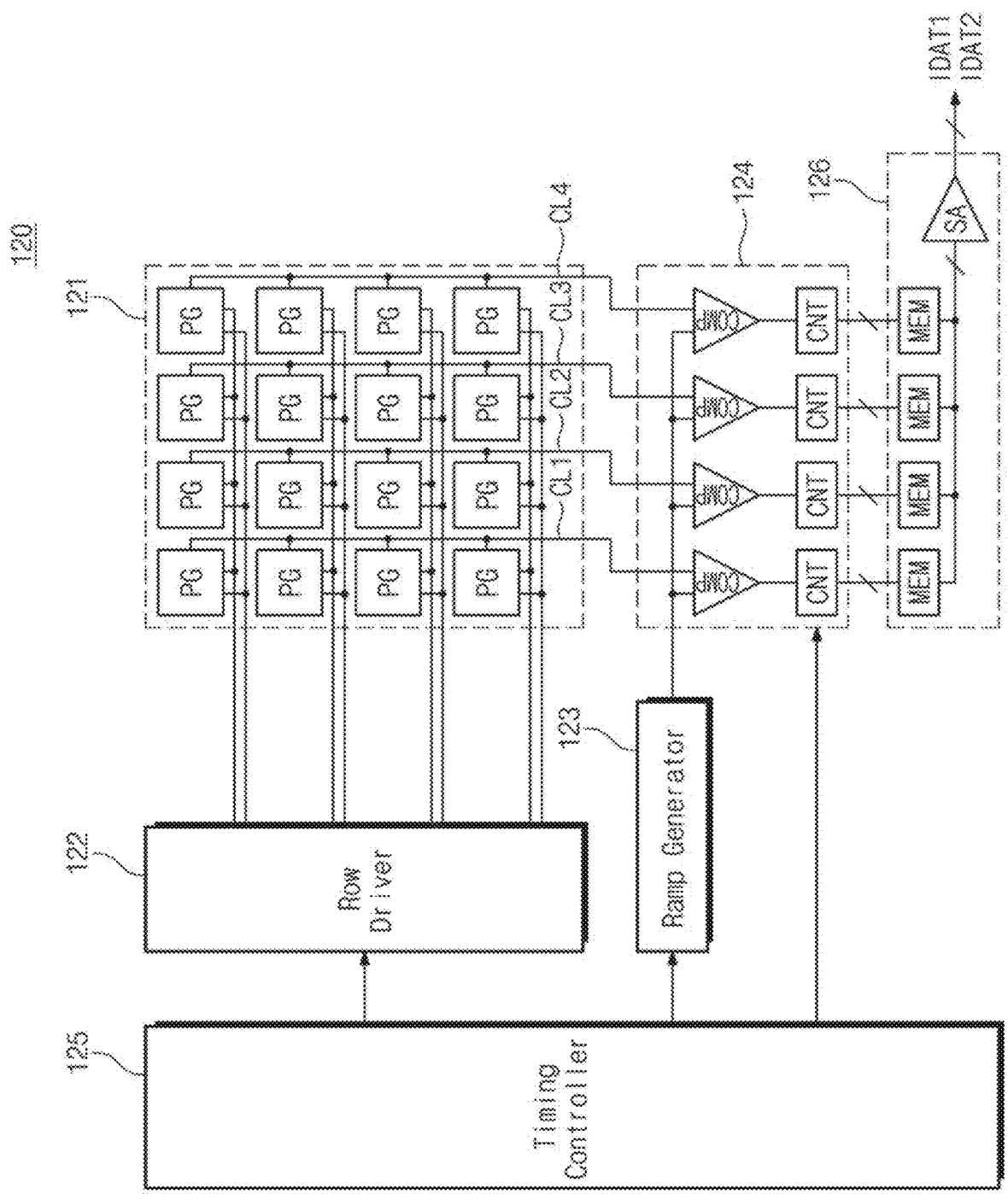
FIG. 2 illustrates an example of a configuration of an image sensor of FIG. 1.

FIG. 2 illustrates an example of a configuration of the image sensor 120 of FIG. 1. The image sensor 120 may include a pixel array 121, a row driver 122, a ramp signal generator 123, an ADC circuit 124, a timing controller 125, and a buffer 126. Below, FIG. 2 will be described together with FIG. 1.

The pixel array 121 may include a plurality of pixels arranged along rows and columns in the form of a matrix. Each of the plurality of pixels may include a photoelectric conversion element. For example, the photoelectric conversion element may include a photo diode, a photo transistor, a photo gate, a pinned photo diode, etc.

The pixel array 121 may include a plurality of pixel groups PG. Each pixel group PG may include two or more pixels, that is, a plurality of pixels. A plurality of pixels constituting a pixel group PG may share one floating diffusion region or a plurality of floating diffusion regions. An example in which the pixel array 121 includes pixel groups PG arranged in four rows and four columns (i.e., 4×4 pixel groups PG) is illustrated in FIG. 2. However, the present disclosure is not limited thereto and different size pixel groups and floating diffusion regions may be used.

The pixel group PG may include pixels of the same color. For example, the pixel group PG may include a red pixel to convert a light of a red spectrum into an electrical signal, a green pixel to convert a light of a green spectrum into an electrical signal, or a blue pixel to convert a light of a blue spectrum into an electrical signal. For example, the pixels constituting the pixel array 121 may be arranged in the form of a tetra-Bayer pattern.

In some example embodiments, the pixel array 121 may include a plurality of pixel groups PG, and at least one of the plurality of pixel groups PG may have a color filter. For example, the pixel group PG may include a red color filter to convert a light into a red spectrum, or a green color filter to convert a light into a green spectrum, or a blue color filter to convert a light into a blue spectrum into an electrical signal.

The pixels of the pixel array 121 may output pixel signals through column lines CL1 to CL4, depending on the intensity or the amount of light received from the outside. For example, the pixel signal may be an analog signal corresponding to the intensity or the amount of light received from the outside.

When the image processing block 100 operates in the first operating mode (e.g., in the case of the low-illuminance environment), the pixel array 121 may output pixel signals under the low conversion gain condition and may output pixel signals under the high conversion gain condition. In operation, when the image processing block 100 operates in the second operating mode (e.g., in the case of the high-illuminance environment), the pixel array 121 may output pixel signals under the low conversion gain condition. The pixel signals may pass through voltage buffers (e.g., source followers) and may then be provided to the ADC circuit 124 through the column lines CL1 to CL4.

The row driver 122 may select and drive a row of the pixel array 121. The row driver 122 may decode an address and/or a control signal generated by the timing controller 125 and may generate control signals for selecting and driving a row of the pixel array 121. For example, the control signals may include a signal for selecting a pixel, a signal for driving a dual conversion transistor, a signal for resetting a floating diffusion region, or the like.

The ramp signal generator 123 may generate a ramp signal under control of the timing controller 125. For example, the ramp signal generator 123 may operate in response to a control signal such as a ramp enable signal. When the ramp enable signal is activated, the ramp signal generator 123 may generate the ramp signal depending on preset (or, alternatively, desired) values (e.g., a start level, an end level, and a slope). In other words, the ramp signal may be a signal that increases or decreases along a preset (or, alternatively, desired) slope during a specific time. The image signal may be provided to the ADC circuit 124.

The ADC circuit 124 may receive pixel signals from the plurality of pixels of the pixel array 121 through the column lines CL1 to CL4, and may receive the ramp signal from the ramp signal generator 123. The ADC circuit 124 may operate based on a correlated double sampling (CDS) technique for obtaining a reset signal and an image signal from received pixel signals and extracting a difference between the reset signal and the image signal as an effective signal component. The ADC circuit 124 may include a plurality of comparators COMP and a plurality of counters CNT.

In detail, each of the comparators COMP may compare the reset signal of the pixel signal and the ramp signal, may compare the image signal of the pixel signal and the ramp signal, and may perform correlated double sampling (CDS) on comparison results. Each of the counters CNT may count pulses of the signal experiencing the correlated double sampling and may output a counting result as a digital signal.

For example, each counter CNT may include an up/down counter, a bit-wise inversion counter, etc. An operation of the bit-wise counter may be similar to an operation of the up/down counter. For example, the bit-wise counter may perform a function of performing up-counting only and a function of converting all internal bits of a counter to obtain the 1's complement when a specific signal is input thereto. The bit-wise counter may perform a reset count, and may then invert a reset counting result so as to convert into the 1's complement, that is, a negative value.

For example, in the first operating mode, each of the counters CNT may independently output a digital signal corresponding to the low conversion gain and a digital signal corresponding to the high conversion gain. In contrast, in the second operating mode, each of the counters CNT may generate a digital signal corresponding to the low conversion gain. An example in which the ADC circuit 124 includes four comparators COMP and four counters CNT is illustrated in FIG. 2, but the present disclosure is not limited thereto.

The timing controller 125 may generate a control signal and/or a clock for controlling an operation and/or a timing of each of the row driver 122, the ramp signal generator 123, and the ADC circuit 124.

The buffer 126 may include memories MEMs and a sense amplifier SA. The memories MEM may store digital signals output from the corresponding counters CNT of the ADC circuit 124. The sense amplifier SA may sense and amplify the digital signals stored in the memories MEMs. The sense amplifier SA may output the amplified digital signals as the image data IDAT1 or IDAT2.

For example, in the case where the digital signal corresponds to the low conversion gain, the amplified digital signal may be output as the first image data IDAT1; in the case where the digital signal corresponds to the high conversion gain, the amplified digital signal may be output as the second image data IDAT2. In other words, the sense amplifier SA may output both the first image data IDAT1 and the second image data IDAT2 in the first operating mode and may output the first image data IDAT1 only in the second operating mode.

Figure 3:
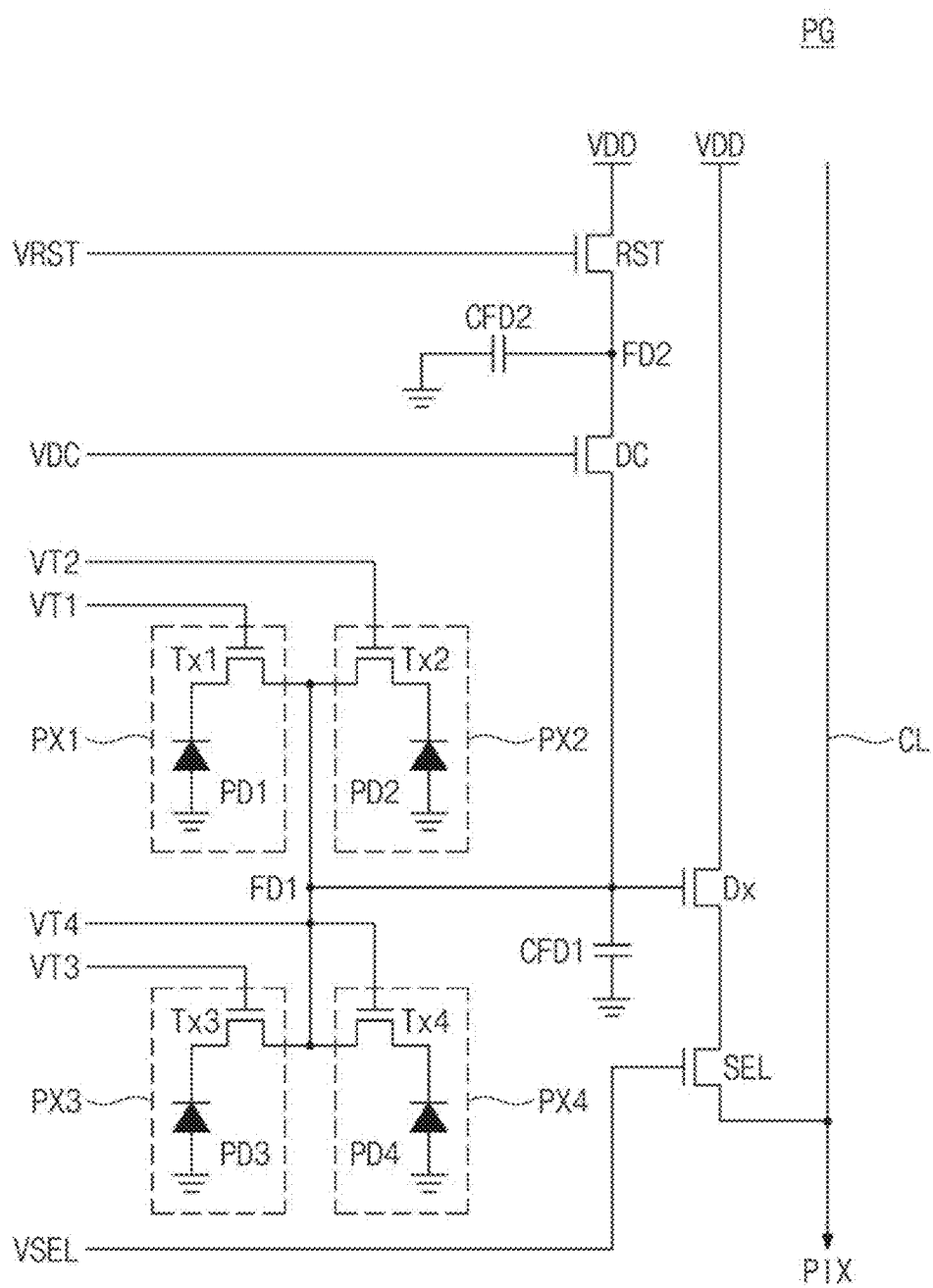
FIG. 3 is a circuit diagram illustrating an example of one of pixel groups of a pixel array of FIG. 2.
Figure 4A:
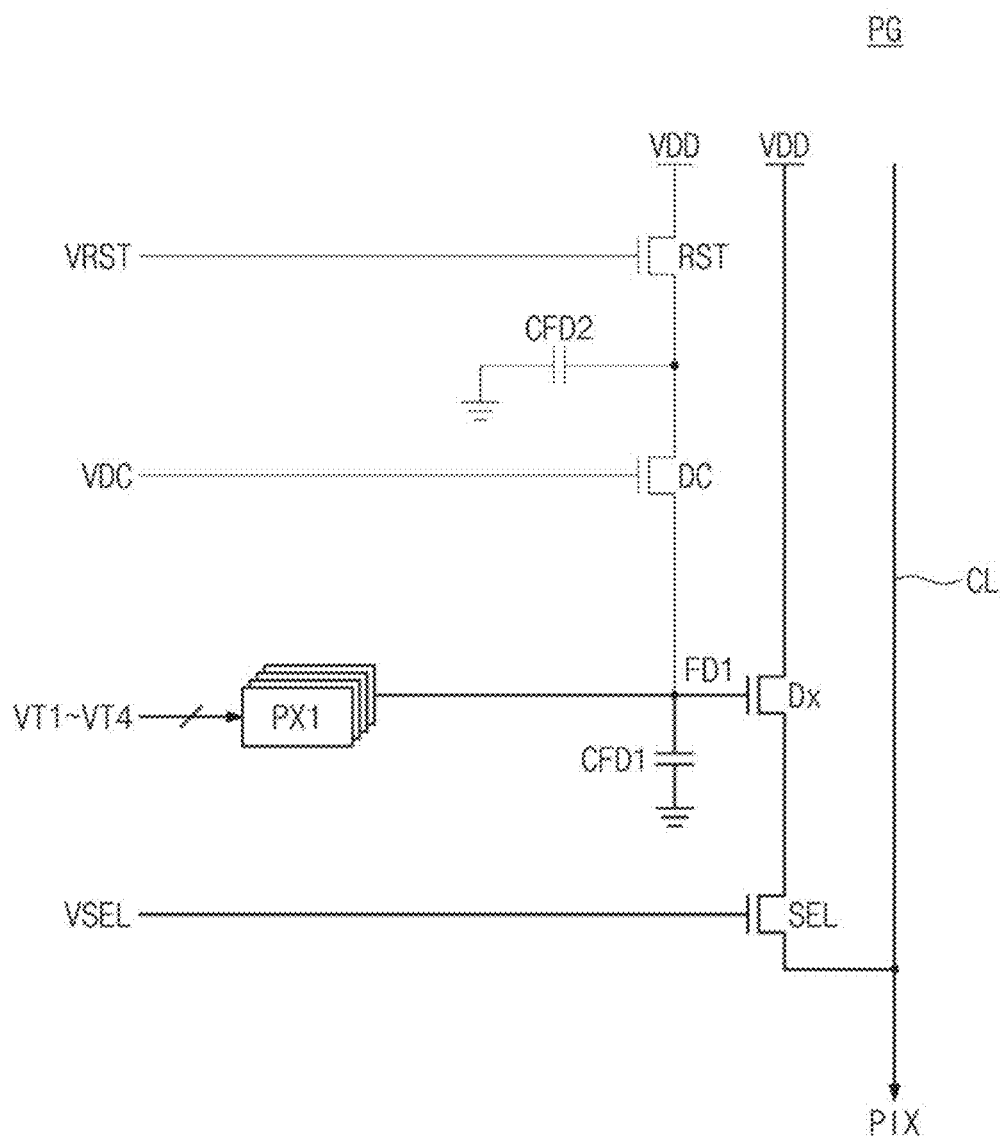
FIG. 4A is a circuit diagram illustrating a floating diffusion region when a dual conversion transistor of FIG. 3 is turned off.
Figure 4B:
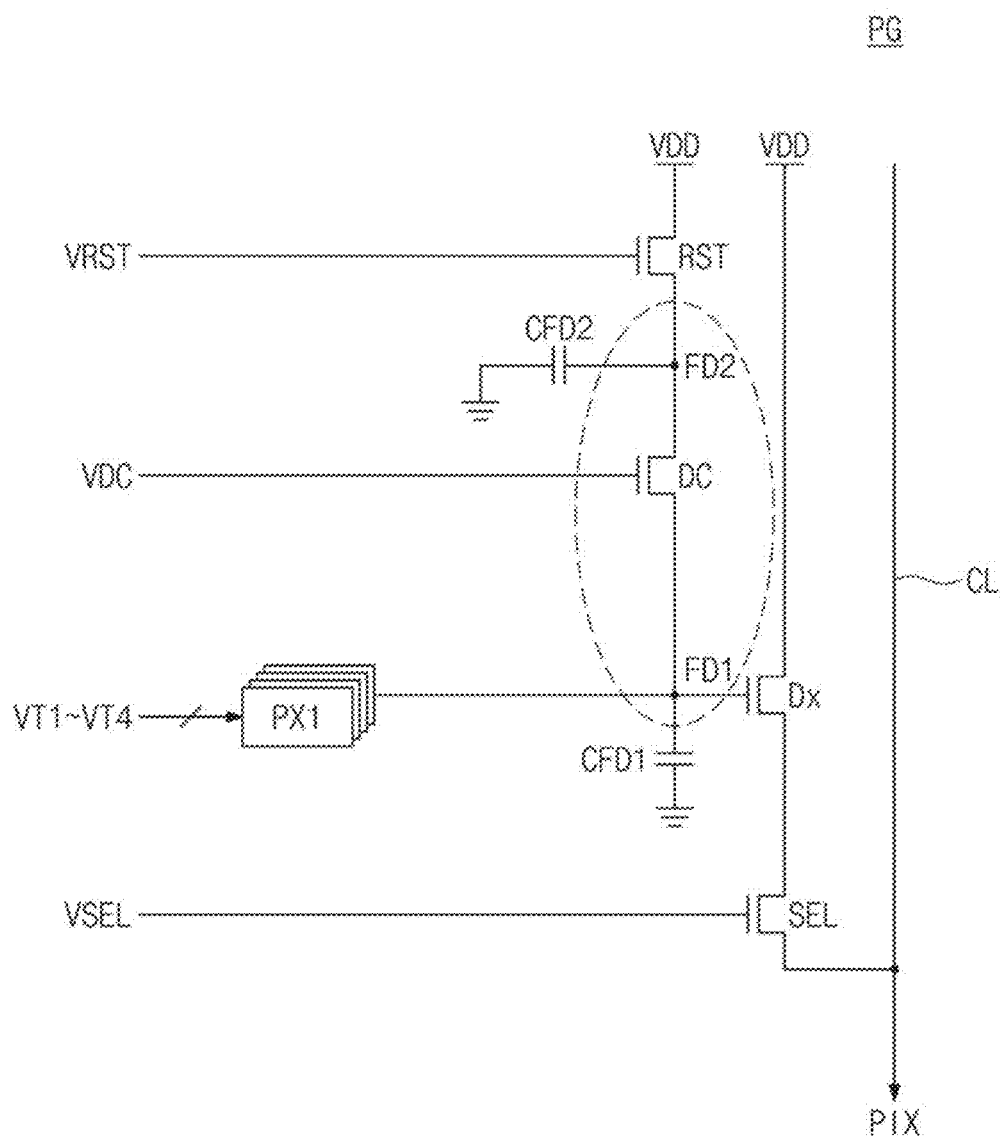

FIG. 3 is a circuit diagram illustrating an example of one of the pixel groups PG of the pixel array 121 of FIG. 2. FIG. 4A is a circuit diagram illustrating a floating diffusion region FD1 when the dual conversion transistor DC of FIG. 3 is turned off. FIG. 4B is a circuit diagram illustrating the floating diffusion regions FD1 and FD2 when the dual conversion transistor DC of FIG. 3 is turned on.

For example, the pixel group PG may include pixels PX1 to PX4, photoelectric conversion elements PD1 to PD4, transfer transistors Tx1 to Tx4, a reset transistor RST, a dual conversion transistor DC, a drive transistor Dx, and a select transistor SEL. An example in which the pixel group PG has a tetracell structure in which four pixels PX1 to PX4 include photoelectric conversion elements PD1 to PD4 respectively is illustrated in FIG. 3, but the present disclosure is not limited thereto. For example, the pixel group PG may be implemented to have various different structures.

The first pixel PX1 may include the first photoelectric conversion element PD1 and the first transfer transistor Tx1, and each of the remaining pixels PX2, PX3, and PX4 may also include similar components/elements. The pixels PX1 to PX4 may share the reset transistor RST, the dual conversion transistor DC, the drive transistor Dx, and the select transistor SEL. Also, the pixels PX1 to PX4 may share the first floating diffusion region FD1.

The first floating diffusion region FD1 or a second floating diffusion region FD2 may accumulate (or integrate) charges corresponding to the amount of incident light. While the transfer transistors Tx1 to Tx4 are respectively turned on by transfer signals VT1 to VT4, the first floating diffusion region FD1 or the second floating diffusion region FD2 may accumulate (or integrate) charges supplied from the photoelectric conversion elements PD1 to PD4. Because the first floating diffusion region FD1 is connected with a gate terminal of the drive transistor Dx operating as a source follower amplifier, a voltage corresponding to the charges accumulated at the first floating diffusion region FD1 may be formed. For example, a capacitance of the first floating diffusion region FD1 is depicted as a first capacitance CFD1.

The dual conversion transistor DC may be driven by a dual conversion signal VDC. When the dual conversion transistor DC is turned off, the capacitance of the first floating diffusion region FD1 may correspond to the first capacitance CFD1. That is, the first floating diffusion region FD1 may have a capacitance value that may correspond to the first capacitance CFD1. In a general environment, for example, a low-illuminance environment, because the first floating diffusion region FD1 is not easily saturated, there is no need to increase the capacitance (i.e., CFD1) of the first floating diffusion region FD1. In this case, the dual conversion transistor DC may be turned off. In some example embodiments, the dual conversion transistor DC may be turned off, and thus the first capacitance CFD1 may correspond to the first floating diffusion region FD1, in the first mode.

However, in a high-illuminance environment, the first floating diffusion region FD1 may be easily saturated. To prevent or reduce the saturation, the dual conversion transistor DC may be turned on such that the first floating diffusion region FD1 and the second floating diffusion region FD2 are electrically connected. In this case, a capacitance (capacitance value) of the floating diffusion regions FD1 and FD2 may be increased to a sum of the first capacitance CFD1 and a second capacitance CFD2. In some example embodiments, the dual conversion transistor DC may be turned on, and thus the first capacitance CFD1 may correspond to the first floating diffusion region FD1 and the second floating diffusion region FD2, in the second mode. In some example embodiments, at least one of the first and second floating diffusion regions FD1 and FD2 may be a capacitor.

The transfer transistors Tx1 to Tx4 may be respectively driven by the transfer signals VT1 to VT4, and may transfer charges generated (or integrated) by the photoelectric conversion elements PD1 to PD4 to the first floating diffusion region FD1 or the second floating diffusion region FD2. For example, first ends of the transfer transistors Tx1 to Tx4 may be respectively connected with the photoelectric conversion elements PD1 to PD4, and second ends thereof may be connected in common with the first floating diffusion region FD1.

The reset transistor RST may be driven by a reset signal VRST and may provide a power supply voltage VDD to the first floating diffusion region FD1 or the second floating diffusion region FD2. As such, the charges accumulated at the first floating diffusion region FD1 or the second floating diffusion region FD2 may move to a terminal for the power supply voltage VDD, and a voltage of the first floating diffusion region FD1 or the second floating diffusion region FD2 may be reset.

The drive transistor Dx may amplify a voltage of the first floating diffusion region FD1 or the second floating diffusion region FD2 and may generate a pixel signal PIX corresponding to a result of the amplification. The select transistor SEL may be driven by a selection signal VSEL and may select pixels to be read in units of row. When the select transistor SEL is turned on, the pixel signal PIX may be output to the ADC circuit 124 of FIG. 2 through a column line CL.

According to some example embodiments of the present disclosure, in the first operating mode (e.g., in the case of the low-illuminance environment), the pixel array 121 may turn on or turn off the dual conversion transistor DC such that a conversion gain is changed and thus may output pixel signals under the low conversion gain condition and the high conversion gain condition, respectively. In detail, the low conversion gain condition may correspond to the case where the dual conversion transistor DC is turned on (FIG. 4B), and the high conversion gain condition may correspond to the case where the dual conversion transistor DC is turned off (a thin solid line of FIG. 4A).

As such, the image sensor 120 may output the first image data IDAT1 corresponding to the low conversion gain and the second image data IDAT2 corresponding to the high conversion gain, and the image signal processor 130 may perform noise reduction using the dual conversion gain, based on the first image data IDAT1 and the second image data IDAT2.

Meanwhile, the above descriptions are given with reference to FIGS. 1 to 3, 4A, and 4B under the assumption that the same exposure time is applied to the pixels constituting the pixel groups PG; in some example embodiments, different exposure times may be applied to the pixels constituting the pixel groups PG. In other words, a first part of the pixels may be driven (or controlled) during a long exposure time, and a second part thereof may be driven (or controlled) during a short exposure time. For example, the noise reduction using the dual conversion gain may be performed when the number of pixels driven during the long exposure time and the number of pixels driven during the short exposure time are the same, but the present disclosure is not limited thereto.

Figure 5:
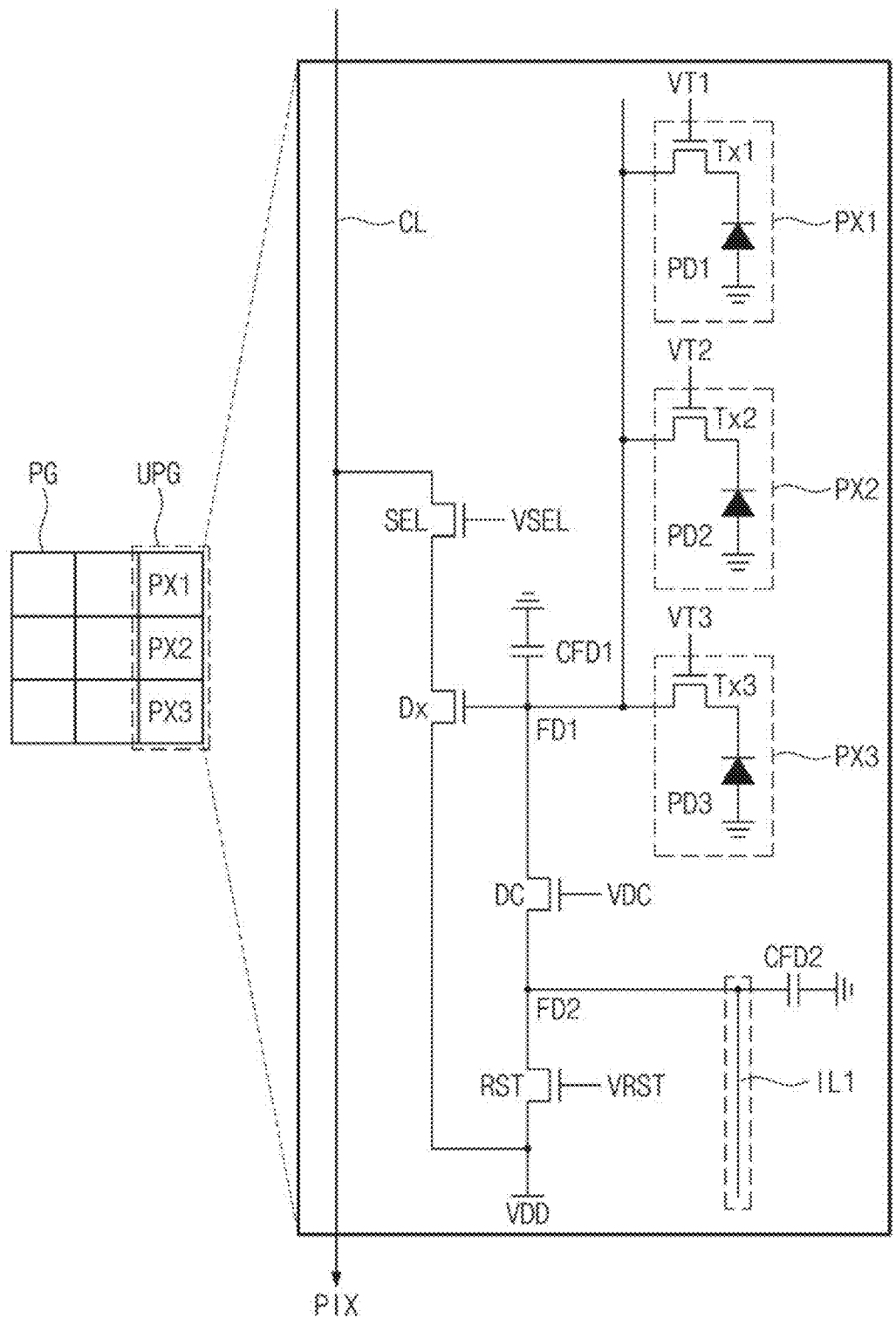
FIG. 5 is a circuit diagram illustrating another example of one of pixel groups of a pixel array of FIG. 2.

FIG. 5 is a circuit diagram illustrating another example of one of pixel groups of a pixel array of FIG. 2. Referring to FIG. 5, the pixel group PG may include three unit pixel groups UPG, and each unit pixel group UPG includes three pixels PX1 to PX3. The first pixel PX1 may include a first photoelectric conversion element PD1 and a first transfer transistor Tx1, and each of the remaining pixels PX2 and PX3 may also include similar components/elements. The pixels PX1 to PX3 may share a reset transistor RST, a dual conversion transistor DC, a drive transistor Dx, and a select transistor SEL. Also, the pixels PX1 to PX3 may share a first floating diffusion region FD1.

The expansion of the capacitance of the first floating diffusion region FD1 by the dual conversion transistor DC, the operation of the transfer transistors Tx1 to Tx3, and the operations of the reset transistor RST, the drive transistor Dx, the select transistor SEL may be mostly similar to those described with reference to FIG. 3, and thus, additional description will be omitted to avoid redundancy.

The second floating diffusion region FD2 may be electrically connected with a floating diffusion region of an adjacent unit pixel group (not illustrated) through a connecting line IL1. In this case, the capacitance of the first floating diffusion region FD1 may be further increased (or expanded). Although not illustrated in drawings, the unit pixel group UPG may further include a switching element (e.g., an element such as the dual conversion transistor DC) for electrically connecting the second floating diffusion region FD2 with the floating diffusion region of the adjacent unit pixel group.

Like the description given with reference to FIG. 3, according to some example embodiments of the present disclosure, in the first operating mode (e.g., in the case of the low-illuminance environment), the pixel array 121 may turn on or turn off the dual conversion transistor DC such that a conversion gain is changed and thus may output pixel signals under the low conversion gain condition and the high conversion gain condition, respectively. As such, the image sensor 120 may output the first image data IDAT1 corresponding to the low conversion gain and the second image data IDAT2 corresponding to the high conversion gain, and the image signal processor 130 may perform noise reduction using the dual conversion gain, based on the first image data IDAT1 and the second image data IDAT2.

In addition, each unit pixel group UPG of FIG. 5 may have different conversion gains (e.g., first to third conversion gains) depending on whether to turn on and turn off the corresponding dual conversion transistor DC. For example, each of the first to third conversion gains may correspond to one of the low conversion gain or the high conversion gain. In this case, the image sensor 120 may perform the noise reduction using the dual conversion gain based on first to third image data respectively corresponding to the first to third conversion gains.

FIG. 6 illustrates an example of determining whether to perform noise reduction DCG NR using a dual conversion gain depending on a shutter time and a conversion gain of the image sensor 120. A shutter time or a shutter speed indicates a time during which the image sensor 120 receives a light, and a conversion gain indicates a ratio in which the image sensor 120 converts a light into an electrical signal. Below, FIG. 6 will be described together with FIG. 1.

As described with reference to FIG. 1, in a low-illuminance environment in which the image sensor 120 fails to receive a light sufficiently, the noise reduction using the dual conversion gain may be performed by the image signal processor 130. In detail, in the case where brightness of an image is not sufficiently secured even though the shutter time of the image sensor 120 increases in the low-illuminance environment, the conversion gain of the image sensor 120 may become higher to obtain a bright image. As the conversion gain increases, a signal to noise ratio of the image sensor 120 may also increase. In particular, in a video shooting case, because a shutter time is restricted to secure a sufficient frame rate, the improvement of the signal to noise ratio may become more important in outputting a video frame.

Accordingly, the image processing block 100 may operate in the first operating mode for the purpose of improving the signal to noise ratio of the image sensor 120 while sufficiently securing the brightness of an image in the low-illuminance environment. In the first operating mode, the image sensor 120 may output image data (e.g., the first image data IDAT1 of FIG. 1) corresponding to the low conversion gain, as well as image data (e.g., the second image data IDAT2 of FIG. 1) corresponding to the high conversion gain. Afterwards, the image signal processor 130 may perform the noise reduction using the dual conversion gain through the normalization and blending operations (e.g., the operations of the normalization circuit 131 and the blending circuit 132) described with reference to FIG. 1.

In contrast, in the high-illuminance environment in which the image sensor 120 receives a light sufficiently and a high conversion gain is not required, the image processing block 100 may operate in the second operating mode. In the second operating mode, the image sensor 120 may only output the image data (e.g., the first image data IDAT1 of FIG. 1) corresponding to the low conversion gain, and the image signal processor 130 may not perform the normalization and blending operations described with reference to FIG. 1.

FIG. 7 illustrates an example of an output image according to a result of determining whether to perform the noise reduction DCG NR using the dual conversion gain, which is described with reference to FIG. 6. Below, FIG. 7 will be described together with FIG. 1.

In a low-illuminance environment, that is, in the case where the image processing block 100 operates in the first operating mode, an output image may be an image that is generated by blending an image corresponding to the low conversion gain and an image corresponding to the high conversion gain. In contrast, in a high-illuminance environment, that is, in the case where the image processing block 100 operates in the second operating mode, an output image may be an image that is generated based on the image corresponding to the low conversion gain.

Figure 8:
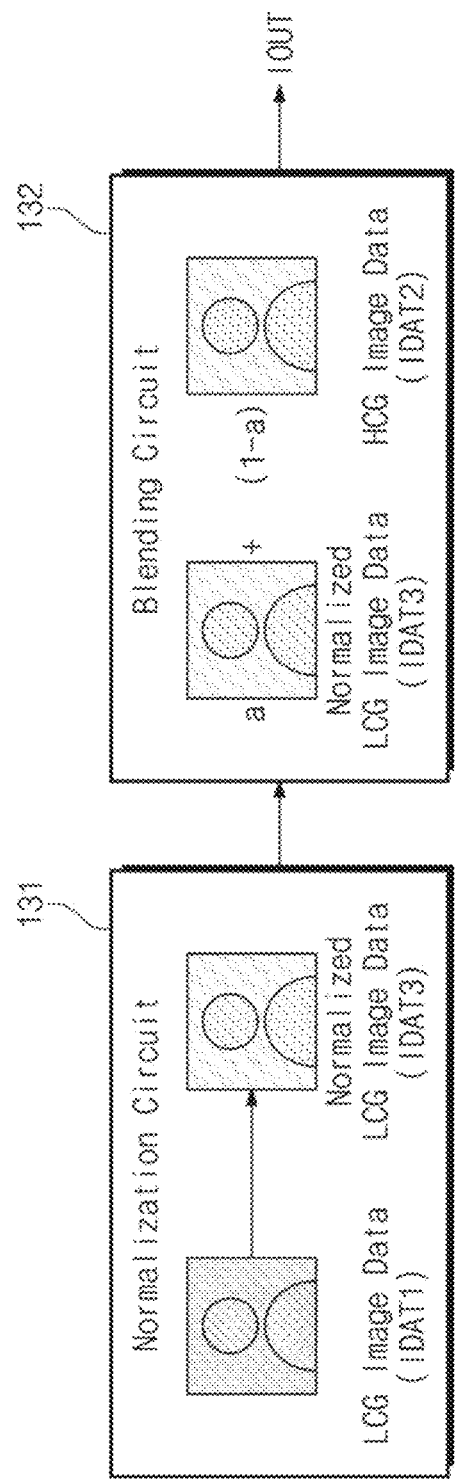
FIG. 8 conceptually illustrates normalization and blending operations according to some example embodiments of the present disclosure.

FIG. 8 conceptually illustrates normalization and blending operations according to some example embodiments of the present disclosure. As described with reference to FIG. 1, to match a dynamic range of the first image data IDAT1 corresponding to the low conversion gain and a dynamic range of the second image data IDAT2 corresponding to the high conversion gain, the normalization circuit 131 may normalize brightness values of the first image data IDAT1 depending on the dynamic range of the second image data IDAT2 and thus may generate the third image data IDAT3.

The blending circuit 132 may output the noise-reduced output image IOUT by multiplying the third image data IDAT3 and the first weight determined in advance, or at the time of calculation, together and multiplying the second image data IDAT2 and the second weight determined in advance, or at the time of calculation, together. For example, the first weight may be set to "a" being a value between "0" and "1", and the second weight may be set to "1−a" being a value of subtracting the first weight from "1".

Figure 9:
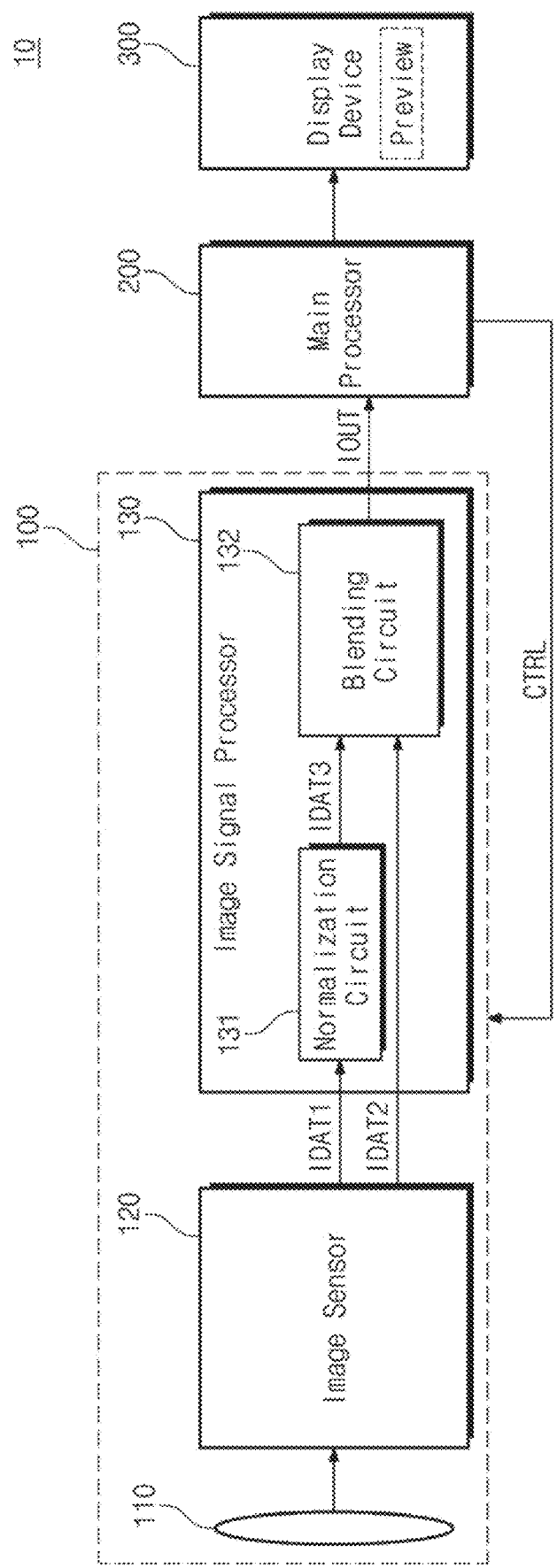
FIG. 9 illustrates an example of a configuration of an electronic device including an image processing block according to some example embodiments of the present disclosure.

FIG. 9 illustrates an example of a configuration of an electronic device 10 including the image processing block 100 according to some example embodiments of the present disclosure. The electronic device 10 may include the image processing block 100, a main processor 200, and a display device 300. An operation of the image processing block 100 is the same as that described with reference to FIG. 1, and thus, additional description will be omitted to avoid redundancy.

The main processor 200 may perform various operations for controlling overall operations of the electronic device 10. For example, the main processor 200 may be implemented with a general-purpose processor, a dedicated processor, or an application processor (AP), and may include one or more processor cores. The main processor 200 may control the image processing block 100 for the purpose of obtaining the output image IOUT.

In particular, based on ambient illuminance of an object to be sensed by an illumination sensor (not illustrated), the main processor 200 according to some example embodiments of the present disclosure may determine whether the image processing block 100 operates in the first operating mode or operates in the second operating mode. The main processor 200 may send a control signal CTRL to the image processing block 100, based on a sensing result of the illumination sensor.

For example, the control signal CTRL may control the turn-on or turn-off the dual conversion transistor DC by controlling the dual conversion signal VDC described with reference to FIGS. 4A and 4B. For example, the control signal CTRL may be enabled in response to a low-illuminance environment. The image processing block 100 may operate in the first operating mode in response to the enabled control signal CTRL and may operate in the second operating mode when the control signal CTRL is not enabled.

Also, the main processor 200 may receive a user input of determining the first operating mode or the second operating mode, based on the ambient illuminance of the object.

As described with reference to FIG. 1, the output image IOUT may be a still image, or may be an image constituting each video frame of a video. The main processor 200 may store a still image or a video stream, which is based on the obtained output image IOUT, in a memory device such as an UFS card, embedded UFS storage, an SD card, an SSD, and/or an eMMC, and may provide the still image or the video stream to the display device 300.

The display device 300 may provide the still image or the video stream, which is based on the output image IOUT, to the user. For example, the display device 300 may include an organic LED (OLED) display device, an active matrix OLED (AMOLED) display device, a light-emitting diode (LED) display device, a liquid crystal display (LCD) device, etc., but the present disclosure is not limited thereto.

For example, in the case where the noise reduction using the dual conversion gain is performed by the image signal processor 130, the still image or the video stream provided to the display device 300 may also be a still image or a video stream experiencing the noise reduction using the dual conversion gain described above. Also, in the case where the output image IOUT is an image constituting each video frame, the display device 300 may provide a video stream, which is based on the output image IOUT, to the user as a preview image.

Accordingly, the still image or the video frame that is based on the output image IOUT experiencing the noise reduction using the dual conversion gain may be stored in the memory device by the main processor 200. Also, the video frame that is based on the output image IOUT experiencing the noise reduction using the dual conversion gain may be provided to the user as a preview image on the display device 300. In other words, the noise reduction using the dual conversion gain according to some example embodiments of the present disclosure may be performed to generate various types of images such as a still image, a video stream, and a preview image.

Figure 10:
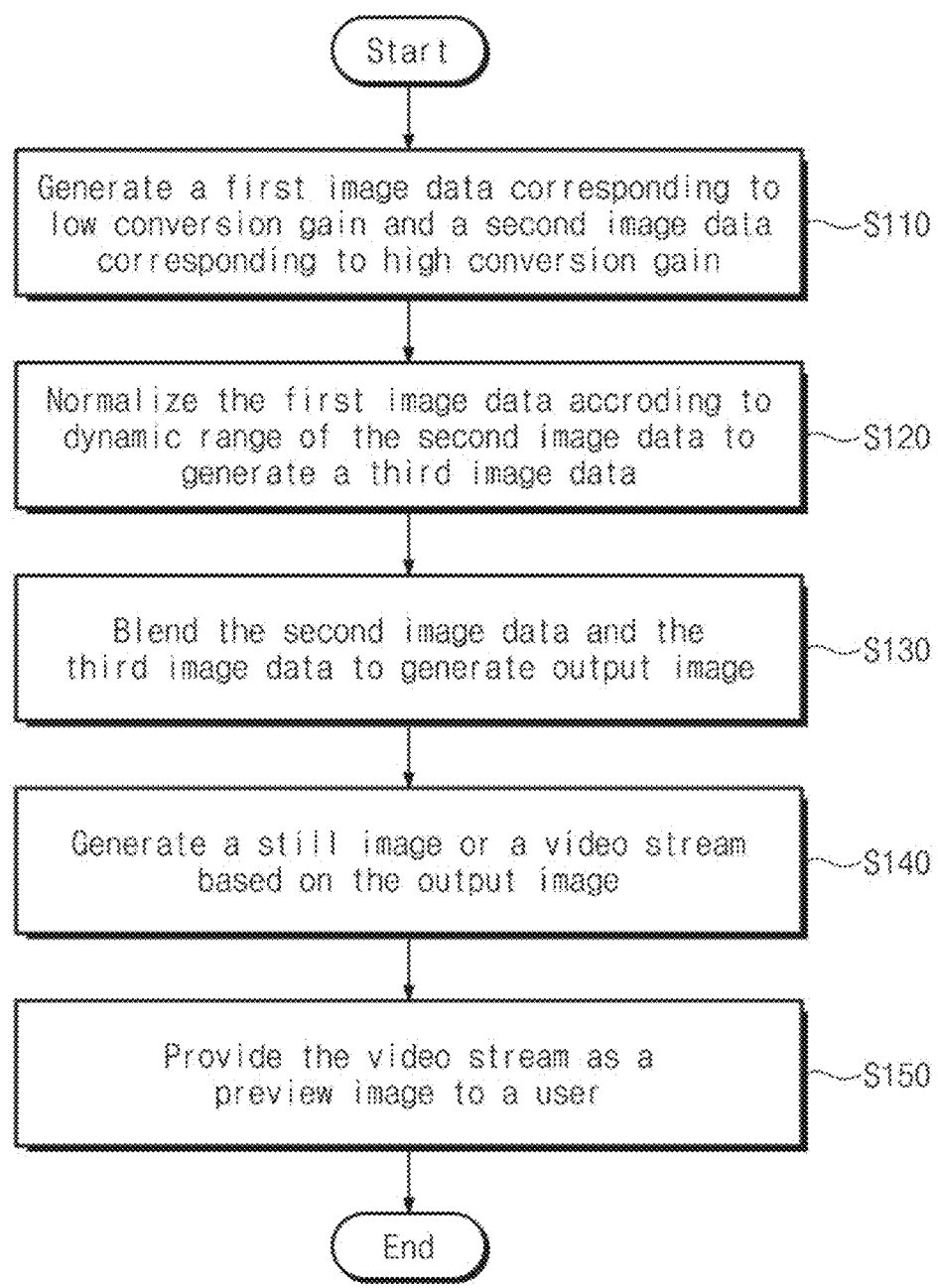
FIG. 10 is a flowchart illustrating a method for noise reduction using a dual conversion gain, according to some example embodiments of the present disclosure.

FIG. 10 is a flowchart illustrating a method for noise reduction using a dual conversion gain, according to some example embodiments of the present disclosure. FIG. 10 will be described with reference to FIGS. 1 and 9.

In operation S110, the image sensor 120 may generate the first image data IDAT1 corresponding to the low conversion gain and the second image data IDAT2 corresponding to the high conversion gain. In operation S120, the normalization circuit 131 of the image signal processor 130 may normalize brightness values of the first image data IDAT1 depending on a dynamic range of the second image data IDAT2 and thus may generate the third image data IDAT3.

In operation S130, the blending circuit 132 of the image signal processor 130 may blend the second image data IDAT2 and the third image data IDAT3 to generate the output image IOUT. For example, the output image IOUT may be generated by multiplying values of the third image data IDAT3 and the first weight (e.g., "a" being a value between "0" and "1") together and multiplying values of the second image data IDAT2 and the second weight (e.g., "1−a") together. That is, the output image IOUT may indicate an image, in which a noise is reduced compared to the first to third image data IDAT1 to IDAT3, by using the dual conversion gain.

In operation S140, the main processor 200 may generate a still image or a video stream, which is based on the output image IOUT, may store the still image or the video stream in the memory device, and may provide the still image or the video stream to the display device 300. Also, in the case where the output image IOUT is an image constituting each video frame, in operation S150, the display device 300 may provide the video stream, which is based on the output image IOUT, to the user as a preview image. That is, the noise reduction using the dual conversion gain according to some example embodiments of the present disclosure may be performed to generate various types of images such as a still image, a video stream, and a preview image, and thus, the signal to noise ratio of the image sensor 120 may be improved.

Figure 11:
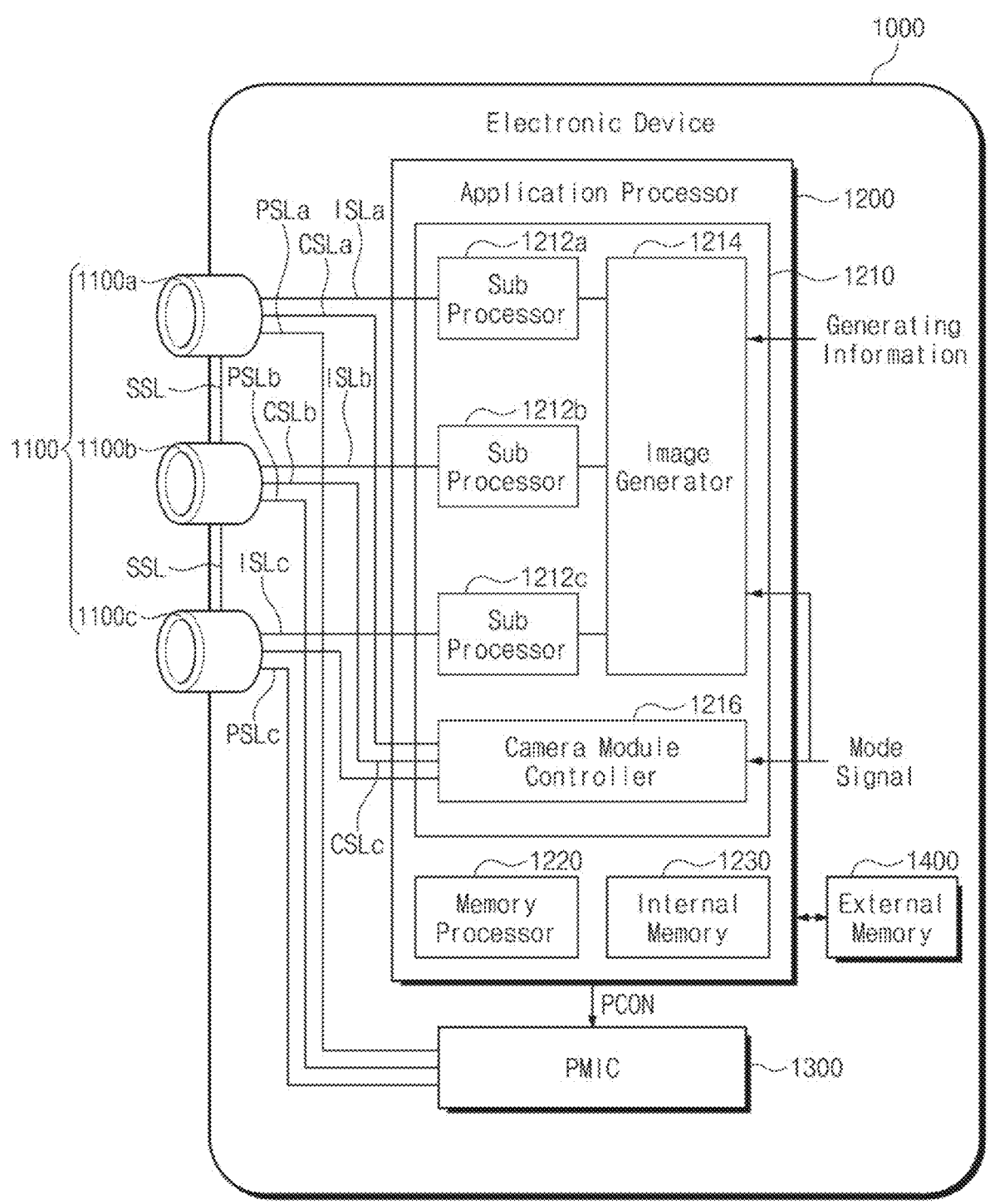
FIG. 11 illustrates an example of a configuration of an electronic device including a camera module in which a device for noise reduction according to some example embodiments of the present disclosure is implemented.
Figure 12:
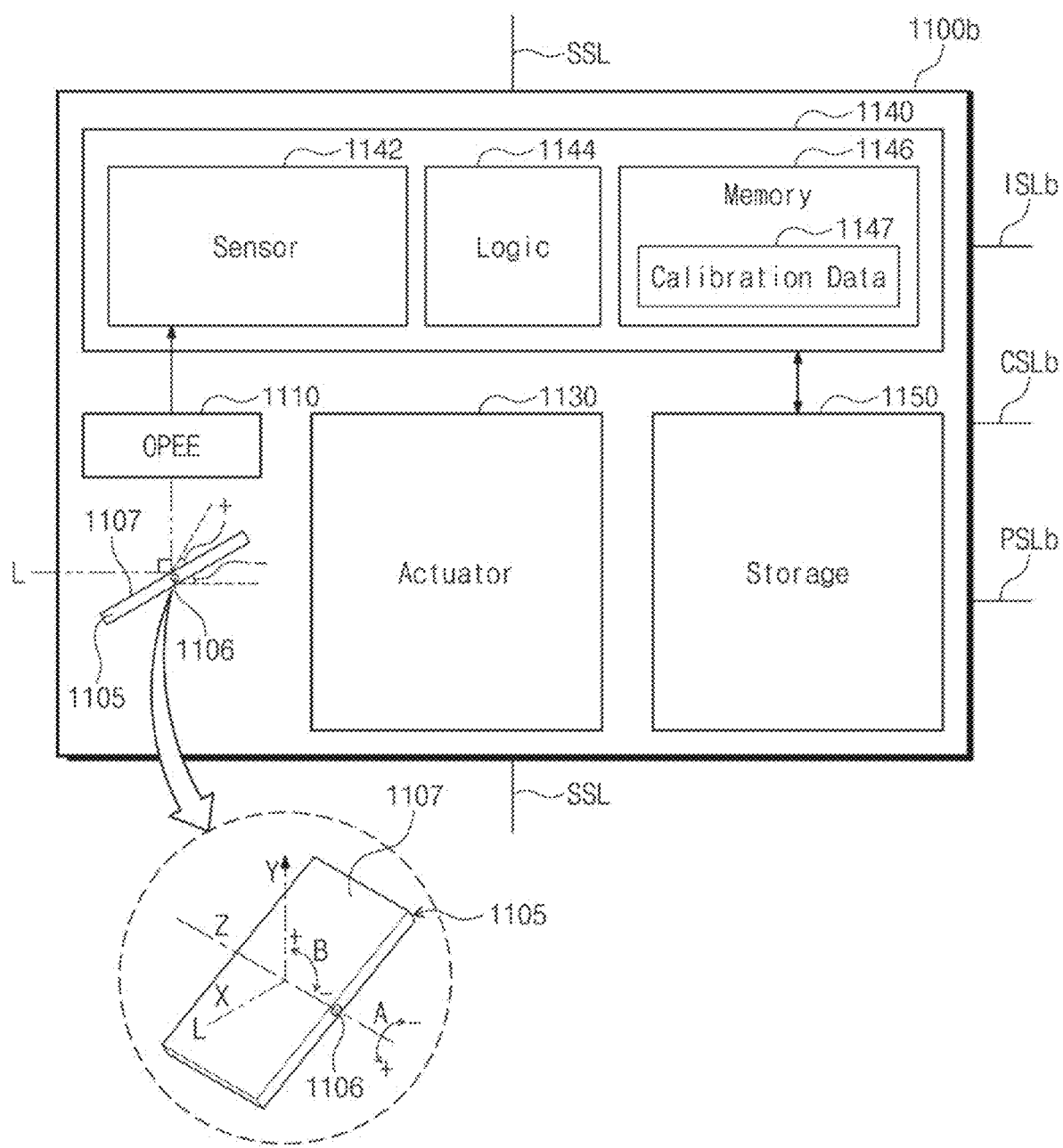
FIG. 12 illustrates an example of a configuration of a camera module of FIG. 11.

FIG. 11 illustrates an example of a configuration of an electronic device including a camera module in which a device for noise reduction according to some example embodiments of the present disclosure is implemented. FIG. 12 illustrates an example of a configuration of a camera module of FIG. 11.

Referring to FIG. 11, an electronic device 1000 may include a camera module group 1100, an application processor 1200, a PMIC 1300, and an external memory 1400.

The camera module group 1100 may include a plurality of camera modules 1100a, 1100b, and 1100c. An electronic device including three camera modules 1100a, 1100b, and 1100c is illustrated in FIG. 11, but the present disclosure is not limited thereto. In some example embodiments, the camera module group 1100 may be modified to include only two camera modules.

Below, a detailed configuration of the camera module 1100b will be more fully described with reference to FIG. 12, but the following description may be equally applied to the remaining camera modules 1100a and 1100c.

Referring to FIG. 12, the camera module 1100b may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In some example embodiments, the prism 1105 may change a path of the light "L" incident in a first direction "X" to a second direction "Y" perpendicular to the first direction "X". Also, the prism 1105 may change the path of the light "L" incident in the first direction "X" to the second direction "Y" perpendicular to the first direction "X" by rotating the reflecting plane 1107 of the light reflecting material in direction "A" about a central axis 1106 or rotating the central axis 1106 in direction "B". In this case, the OPFE 1110 may move in a third direction "Z" perpendicular to the first direction "X" and the second direction "Y".

In some example embodiments, as illustrated, a maximum rotation angle of the prism 1105 in direction "A" may be equal to or smaller than 15 degrees in a positive A direction and may be greater than 15 degrees in a negative A direction, but the present disclosure is not limited thereto.

In some example embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In some example embodiments, the prism 1105 may move the reflecting plane 1107 of the light reflecting material in the third direction (e.g., a Z direction) parallel to a direction in which the central axis 1106 extends.

The OPFE 1110 may include optical lenses composed of "m" groups (m being a natural number), for example. Here, "m" lens may move in the second direction "Y" to change an optical zoom ratio of the camera module 1100b. For example, when a default optical zoom ratio of the camera module 1100b is "Z", the optical zoom ratio of the camera module 1100b may be changed to an optical zoom ratio of 3Z, 5Z, or 5Z or more by moving "m" optical lens included in the OPFE 1110. The OPFE 1110 may further include "n" groups of optical lenses (n being a natural number) in front of the "m" lenses described above.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light "L" provided through an optical lens. The control logic 1144 may control overall operations of the camera module 1100b. For example, the control logic 1144 may control an operation of the camera module 1100b based on a control signal provided through a control signal line CSLb.

The memory 1146 may store information, which is necessary for an operation of the camera module 1100b, such as calibration data 1147. The calibration data 1147 may include information necessary for the camera module 1100b to generate image data by using the light "L" provided from the outside. The calibration data 1147 may include, for example, information about the degree of rotation described above, information about a focal length, information about an optical axis, etc. In the case where the camera module 1100b is implemented in the form of a multi-state camera in which a focal length varies depending on a location of an optical lens, the calibration data 1147 may include a focal length value for each location (or state) of the optical lens and information about auto focusing.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In some example embodiments, the storage 1150 may be implemented with an electrically erasable programmable read only memory (EEPROM), but the present disclosure is not limited thereto.

Referring together to FIGS. 11 and 12, in some example embodiments, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 therein.

In some example embodiments, one camera module (e.g., 1100b) among the plurality of camera modules 1100a, 1100b, and 1100c may be a folded lens shape of camera module in which the prism 1105 and the OPFE 1110 described above are included, and the remaining camera modules (e.g., 1100a and 1100c) may be a vertical shape of camera module in which the prism 1105 and the OPFE 1110 described above are not included; however, the present disclosure is not limited thereto.

In some example embodiments, one camera module (e.g., 1100c) among the plurality of camera modules 1100a, 1100b, and 1100c may be, for example, a vertical shape of depth camera extracting depth information by using an infrared ray (IR). In this case, the application processor 1200 may merge image data provided from the depth camera and image data provided from any other camera module (e.g., 1100a or 1100b) and may generate a three-dimensional (3D) depth image.

In some example embodiments, at least two camera modules (e.g., 1100a and 1100b) among the plurality of camera modules 1100a, 1100b, and 1100c may have different fields of view. In this case, the at least two camera modules (e.g., 1100a and 1100b) among the plurality of camera modules 1100a, 1100b, and 1100c may include different optical lens, not limited to.

Also, in some example embodiments, fields of view of the plurality of camera modules 1100a, 1100b, and 1100c may be different. In this case, the plurality of camera modules 1100a, 1100b, and 1100c may include different optical lens, not limited thereto.

In some example embodiments, the plurality of camera modules 1100a, 1100b, and 1100c may be disposed to be physically separated from each other. That is, the plurality of camera modules 1100a, 1100b, and 1100c may not use a sensing area of one image sensor 1142, but the plurality of camera modules 1100a, 1100b, and 1100c may include independent image sensors 1142 therein, respectively.

Returning to FIG. 11, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented with separate semiconductor chips.

The image processing device 1210 may include a plurality of sub image processors 1212a, 1212b, and 1212c, an image generator 1214, and a camera module controller 1216.

The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but the present disclosure is not limited thereto.

Meanwhile, in some example embodiments, one sub image processor may be disposed to correspond to a plurality of camera modules. For example, the sub image processor 1212a and the sub image processor 1212c may be integrally implemented, not separated from each other as illustrated in FIG. 12; in this case, one of the pieces of image data respectively provided from the camera module 1100a and the camera module 1100c may be selected through a selection element (e.g., a multiplexer), and the selected image data may be provided to the integrated sub image processor.

For example, each of the sub image processors 1212a, 1212b, and 1212c may normalize a brightness value of image data corresponding to a low conversion gain depending on a dynamic range of image data corresponding to a high conversion gain, and may perform the noise reduction using the dual conversion gain by blending the normalized image data and the image data corresponding to the high conversion gain.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information Generating Information or a mode signal.

In detail, the image generator 1214 may generate the output image by merging at least a portion of the image data respectively generated from the camera modules 1100a, 1100b, and 1100c having different fields of view, depending on the image generating information Generating Information or the mode signal. Also, the image generator 1214 may generate the output image by selecting one of the image data respectively generated from the camera modules 1100a, 1100b, and 1100c having different fields of view, depending on the image generating information Generating Information or the mode signal.

In some example embodiments, the image generating information Generating Information may include a zoom signal or a zoom factor. Also, in some example embodiments, the mode signal may be, for example, a signal based on a mode selected from a user.

In the case where the image generating information Generating Information is the zoom signal (or zoom factor) and the camera modules 1100a, 1100b, and 1100c have different visual fields of view, the image generator 1214 may perform different operations depending on a kind of the zoom signal. For example, in the case where the zoom signal is a first signal, the image generator 1214 may merge the image data output from the camera module 1100a and the image data output from the camera module 1100c and may generate the output image by using the merged image signal and the image data output from the camera module 1100b that is not used in the merging operation. In the case where the zoom signal is a second signal different from the first signal, without the image data merging operation, the image generator 1214 may select one of the image data respectively output from the camera modules 1100a, 1100b, and 1100c and may output the selected image data as the output image. However, the present disclosure is not limited thereto, and a way to process image data may be modified without limitation if necessary.

In some example embodiments, the image generator 1214 may generate merged image data having an increased dynamic range by receiving a plurality of image data of different exposure times from at least one of the plurality of sub image processors 1212a, 1212b, and 1212c and performing high dynamic range (HDR) processing on the plurality of image data. Also, the image generator 1214 may receive image data, which experience the noise reduction using the dual conversion gain, from among at least one of the plurality of sub image processors 1212a, 1212b, and 1212c.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) depending on the image generating information Generating Information including a zoom signal or the mode signal, and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In some example embodiments, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some example embodiments, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one among sub image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may adjust a level of the power. The power control signal PCON may include a power adjustment signal for each operating mode of the plurality of camera modules 1100a, 1100b, and 1100c. For example, the operating mode may include a low-power mode. In this case, the power control signal PCON may include information about a camera module operating in the low-power mode and a set power level. Levels of the powers respectively provided to the plurality of camera modules 1100a, 1100b, and 1100c may be identical to each other or may be different from each other. Also, a level of a power may be dynamically changed.

According to some example embodiments of the present disclosure, a signal to noise ratio of an image sensor may be improved. In particular, according to some example embodiments of the present disclosure, a noise of an output signal may be effectively reduced in a video shooting mode.

While the present disclosure has been described with reference to some example embodiments thereof, it will be apparent to those of ordinary skill in the art that various changes and modifications may be made thereto without departing from the spirit and scope of the present disclosure as set forth in the following claims.

What is claimed is:
1. An image processing device comprising:
   an image sensor including a pixel array, the pixel array being configured to
      generate a first pixel signal corresponding to a first conversion gain based on receiving light reflected from an object, and generate a second pixel signal based on receiving light reflected from the object corresponding to a second conversion gain from pixels sharing a floating diffusion region, and the image sensor being configured to generate first image data and second image data based on the first pixel signal and the second pixel signal; and an image signal processor configured to generate an output image based on the first image data and the second image data, the image signal processor including a normalization circuit configured to normalize the first image data based on a dynamic range of the second image data to generate third image data; and a blending circuit configured to generate the output image based on the second image data and the third image data in response to an ambient illuminance of the object.

2. The image processing device of claim 1, wherein
the first pixel signal corresponds to charges stored at the floating diffusion region having a first capacitance value, and
the second pixel signal corresponds to charges stored at the floating diffusion region having a second capacitance value.

3. The image processing device of claim 2, wherein the pixel array includes a capacitor connected with the floating diffusion region to obtain the second capacitance value.

4. The image processing device of claim 1, wherein the blending circuit is configured to
assign a first weight to the third image data and
assign a second weight to the second image data.

5. The image processing device of claim 4, wherein each of the first weight and the second weight has a value between "0" and "1", and a sum of the first weight and the second weight is "1".

6. The image processing device of claim 1, wherein the pixels of the pixel array include first pixels controlled based on a first exposure time and second pixels controlled based on a second exposure time, and
wherein, based on a number of the first pixels and a number of the second pixels being equal, the blending circuit is configured to generate the output image based on the second image data and the third image data.

7. An electronic device comprising:
a lens configured to receive a light reflected from an object;
an image sensor including a pixel array, the pixel array configured to
generate a first pixel signal corresponding to a first conversion gain and a second pixel signal corresponding to a second conversion gain from pixels sharing a floating diffusion region, and
the image sensor configured to receive a light from the lens and generate first image data and second image data based on the first pixel signal and the second pixel signal;
an image signal processor configured to generate an output image based on the first image data or the second image data; and
a main processor configured to generate a video stream based on the output image,
the image signal processor including
a normalization circuit configured to normalize the first image data based on a dynamic range of the second image data to generate third image data; and a blending circuit configured to generate the output image based on the second image data and the third image data in response to an ambient illuminance of the object.

8. The electronic device of claim 7, wherein
the first pixel signal corresponds to charges stored at the floating diffusion region having a first capacitance value, and
the second pixel signal corresponds to charges stored at the floating diffusion region having a second capacitance value.

9. The electronic device of claim 8, wherein the pixel array includes a capacitor connected with the floating diffusion region to obtain the second capacitance value.

10. The electronic device of claim 7, wherein the blending circuit is configured to assign a first weight to the third image data and assign a second weight to the second image data.

11. The electronic device of claim 10, wherein each of the first weight and the second weight has a value between "0" and "1", and a sum of the first weight and the second weight is "1".

12. The electronic device of claim 7, wherein the main processor is configured to determine to activate an operation of the blending circuit based on receiving a user input.

13. The electronic device of claim 7, wherein the main processor is configured to output the video stream to a display device as a preview image in which a noise is reduced.

14. The electronic device of claim 7, wherein
the pixels of the pixel array include first pixels controlled based on a first exposure time and second pixels controlled based on a second exposure time, and
based on a number of the first pixels and a number of the second pixels being equal, the blending circuit is configured to generate the output image based on the second image data and the third image data.

15. An operation method of a device for noise reduction, the method comprising:
generating first image data corresponding to a first conversion gain and second image data corresponding to a second conversion gain;
normalizing the first image data based on a dynamic range of the second image data to generate third image data;
generating an output image based on the first image data or the second image data;
determining to perform the generating of the third image data and the generating of the output image based on an ambient illuminance of an object corresponding to the first image data and the second image data; and
generating a video stream based on the output image.

16. The method of claim 15, wherein the first conversion gain is smaller than the second conversion gain.

17. The method of claim 15, wherein the generating of the output image includes:
assigning a first weight and a second weight to the third image data and the second image data, respectively.

18. The method of claim 17, wherein each of the first weight and the second weight has a value between "0" and "1", and a sum of the first weight and the second weight is "1".

19. The method of claim 15, further comprising:
outputting the video stream to a display device as a preview image in which a noise is reduced.

* * * * *